United States Patent [19]

Perl

[11] Patent Number: 4,781,170
[45] Date of Patent: Nov. 1, 1988

[54] TRAVELING FLAME BURNER

[75] Inventor: Richard L. Perl, Mansfield, Ohio

[73] Assignee: The Tappan Company, Ohio

[21] Appl. No.: 17,921

[22] Filed: Feb. 24, 1987

[51] Int. Cl.[4] .............................................. F24C 3/00
[52] U.S. Cl. .................................. 126/39 E; 126/41 R;
 99/390; 99/401; 219/405; 219/409
[58] Field of Search ................. 126/39 E, 39 L, 41 R,
 126/41 B, 91 A; 99/390, 401; 34/222, 229, 29,
 57 E, 58; 219/405, 409

[56] References Cited

U.S. PATENT DOCUMENTS

| | | | |
|---|---|---|---|
| 3,340,794 | 9/1967 | Giuliano | 126/41 X |
| 3,943,910 | 3/1976 | White | 126/41 R |
| 4,416,249 | 11/1983 | Reynolds | 126/41 R |

Primary Examiner—Larry Jones
Attorney, Agent, or Firm—Alfred E. Miller

[57] ABSTRACT

A cooking appliance includes an elongated heat source, which may be a gas burner tube. The elongated heat source is mounted for movement in a horizontal plane perpendicular to the longitudinal axis of the heat source, and a driving arrangement is provided for reciprocating the heat source in the horizontal plane.

22 Claims, 3 Drawing Sheets

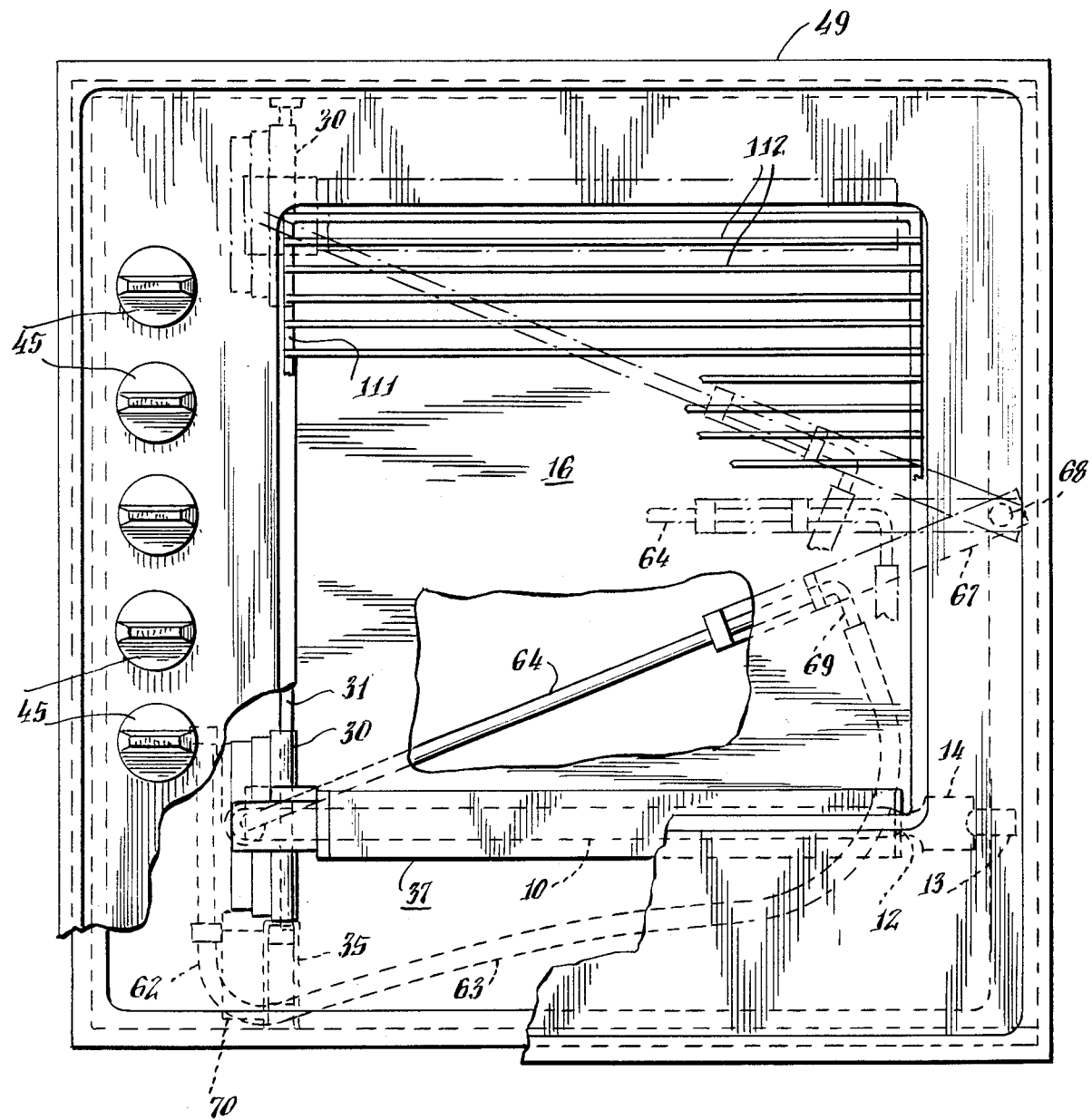

TRAVELING FLAME BURNER

This invention relates to surface cooking devices, and is more in particular directed to an improved cooking assembly of the type generally referred to as a grill or a range. While the invention will be specifically described below only with reference to the use of a gas heat source, it will be apparent that the invention is not so limited, and is also applicable to other heat sources such as electric heat sources.

In a conventional gas grill, a fixed gas burner is generally provided beneath an open grill supporting food to be grilled or broiled. When such devices are employed to grill foods such as meat, there is a tendency for grease to drip from the food onto the burner or in the close proximity of the burner, resulting in flames and smoke. Aside from affecting the taste of the cooked product, this disadvantage can also constitute a fire hazzard. In addition, since the burner units provide flame or heat only at discrete regions, for example, a circular area or elongated area, the flame is generally not applied evenly to all portions of the food.

The present invention is therefore directed to the provision of a cooking assembly that overcomes the above disadvantages, as well as other disadvantages, of known devices.

Briefly stated, in accordance with the invention, a cooking appliance is comprised of a substantially horizontal elongated heat source. A means such as an electric motor or the like are provided for reciprocating the heat source in a horizontal plane in a direction substantially transverse to the longitudinal direction of the heat source. A source of energy is provided for the heat source, such as a gas supply, electric means or the like, with means being provided for directing energy from the source of energy to the heat source.

In accordance with a preferred embodiment of the invention, I provide an elongated heat source, such as a gas burner tube. The gas burner tube may have a horizontal portion adapted to be removed from a curved portion for cleaning. The burner tube is horizontal, and is mounted to be movable in a horizontal plane, for example, in a plane perpendicular to the lengthwise extension of the tube. The gas tube is connected to a gas supply by way of a flexible supply tube. In addition, a driving arrangement is provided enabling reciprocating movement of the tube beneath food to be cooked, for example, positioned on an open grill.

The arrangement in accordance with the invention permits substantially even heating of a larger area than prior devices, and the size of the area can be controlled by the use of stops or programming control for controlling the displacement of the burner. The area that is heated is rectangular, thereby enabling efficient (energy saving) distribution of the heat, depending on the size of the load. Since the burner is moving, there is less danger of ignition of drippings from the food into the pan of the device than when a fixed burner is employed, especially since the moving burner, being positioned close to the grill, cannot heat the pan to the extent that a fixed burner can, and the moving burner is not as apt to have concentrated heat at one spot that the drippings may be ignited as they fall.

In accordance with the invention, the heat source is very intense, and is very close to the food. This results in the generation of less smoke and fire since an area of fat does not have a "fixed" burner flame beneath it. The flame impinging on the food tends to burn off the smoke.

The burner unit can constitute a stand alone unit, for example, mounted in a counter. It can also be portable, or it can be employed in combination with one or more fixed burner units. When gas is employed as the fuel, it is preferable that the igniter be mounted to travel with the burner element, so that the gas may be ignited anywhere in the displacement of the burner element.

In order that the invention may be more clearly understood, it will now be disclosed in greater detail with reference to the accompanying drawing, wherein:

FIG. 3 is a top partially cut-away view of the assembly of FIG. 1; and

Figure 1:
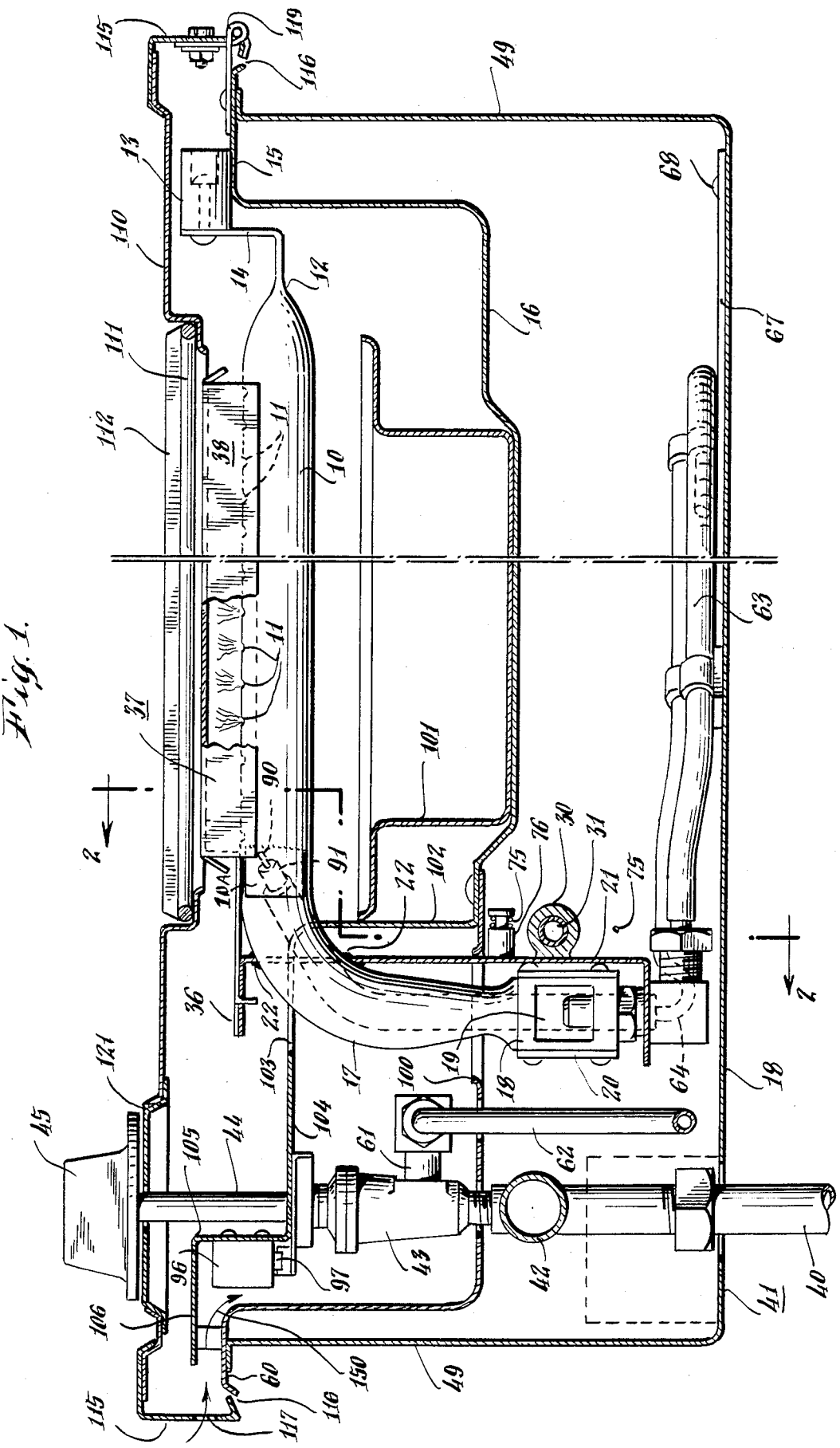
FIG. 1 is a vertical cross sectional view of a cooking assembly in accordance with the invention.
Figure 2:
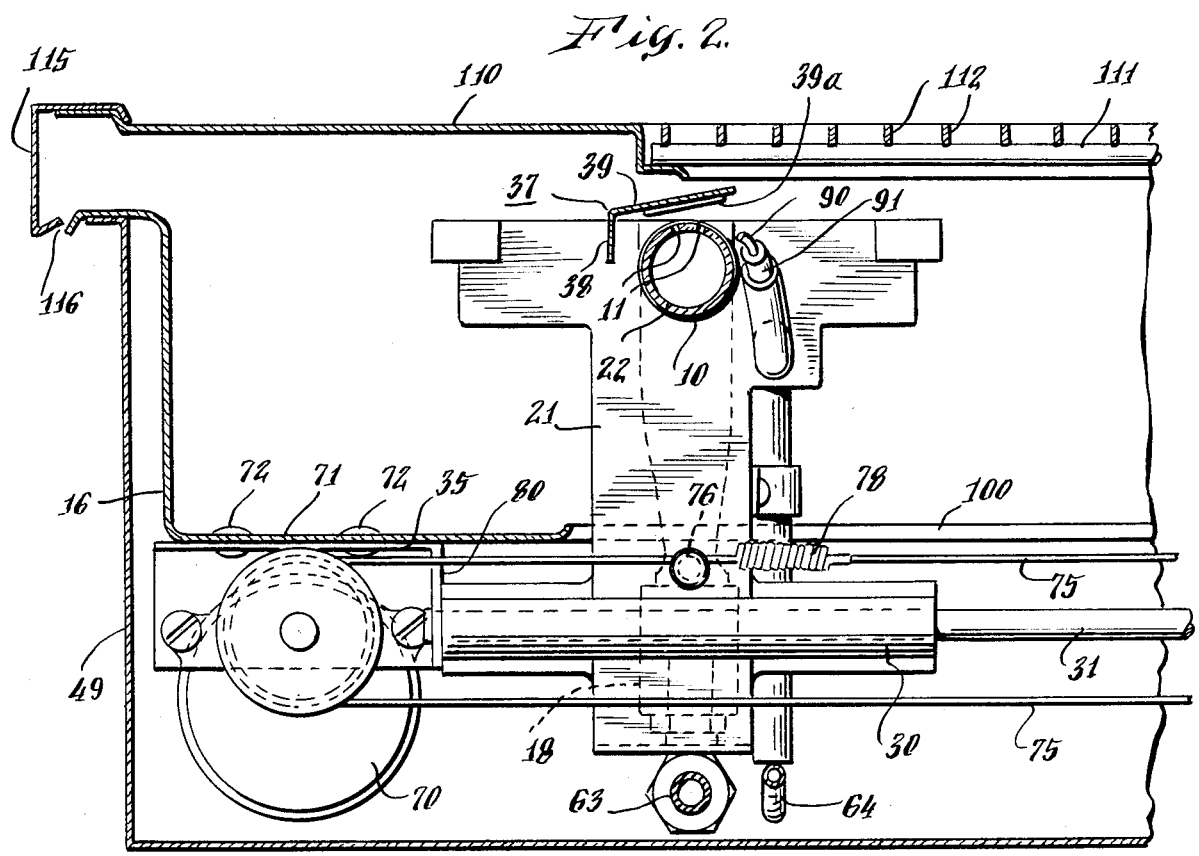
FIG. 2 is a cross sectional view of the assembly of FIG. 1 taken along the lines 2—2.

Referring now to the drawings, as illustrated in FIGS. 1 and 2, an elongated burner tube 10 is mounted to extend in the horizontal direction, and has a row of gas outlet apertures 11 in or near its upper surface.

As illustrated in FIG. 1, the gas outlet apertures 11 may be distributed along the length of the burner 10, and is preferably in the form of a single row of apertures at or near the top of the burner 10. One end 12 of the burner tube is closed, and a roller 13 may optionally be mounted herein for rotation about a horizontal axis parallel to the longitudinal direction of the burner tube. The additional support of the roller 13 is not required, however, the supply tube has adequate strength to support the burner tube by cantilever action. If desired, the closed end of the burner tube may be upwardly offset as illustrated at 14, to permit the roller 13 to roll on a rear horizontal surface 15 of the pan 16.

The forward end 17 of the burner tube forms a gas inlet and extends downwardly to an orifice housing 18 of conventional construction, having at least one side opening port 19 in its cylindrical outer surface, which may be selectively closed by the sheet metal closure 20 of C-shaped cross section adapted to encircle the orifice housing for proper air-gas mixture. The gas burner 10maybe joined to the gas inlet end at a separable joint 10A, in order to enable the removal of the burner 10 for cleaning.

The gas inlet end 17 of the burner tube is supported in a movable frame 21, for example, by being brazed or the like as at 22 wherein it extends through an aperture in a vertical wall 23 of the frame. A slide tube 30, which may be of brass, is affixed to the lower portion of the wall 23, i.e., below the burner, the axis of the slide tube 30 extending horizontally from side to side of the assembly. The slide tube 30 rides on a guide rod or tube 31 which is horizontally held in the structure, for example, in suitable brackets, such as the brackets 35 (FIG. 2) mounted to the drip pan 16. The guide tube 31 thereby supports the front end of the burner, and, in this embodiment of the invention, the roller 13 supports the rear end of the burner, so that the burner may be moved in a horizontal plane from side to side in the assembly. It is, of course, apparent that use of the roller 13 may be obviated by providing adequate strength in structure to support the burner by cantilever action.

A horizontal forwardly extending wall portion 36 extending from the top of the vertical wall 23 of frame 21 supports an elongated flame deflector 37 that extends along the burner tube. The deflector can alternately be either fixedly or removably mounted to the tube. As illustrated in FIG. 2, the cross section of the flame deflector has a vertically extending portion 38 spaced from one side of the burner tube and extending parallel thereto, and an inclined section 39 joined thereto and extending over the top of the burner tube, the higher side of the inclined portion 39 being away from the vertical portion 38.

It will be apparent that the inclined portion 39 extends across the apertures 11, i.e., such that the apertures 11 are not directly vertically exposed. The requirements of clean combustion determine the angle and clearance of the deflector from the burner. The deflector 37 thus prevents the apertures 11 from being plugged up, for example, by grease or other drippings from food being cooked. If desired, the central portion of the deflector may be held to the burner tube by spacing rivets (not shown) or other conventional holding devices. The deflector 39 may be coated or provided with a layer 39a of a material, such as ceramic, or be made of stainless steel or Inconel 60, to withstand the heat of the flame.

The gas inlet 40 to the assembly, as shown in FIG. 1, extends through the frame 41 to a horizontal manifold 42. A gas valve 43 extends upwardly from the manifold, and has a vertical control shaft 44 terminated by a control knob 45 above the top surface 60 of the assembly. The frame 41 has a bottom wall 48 coextensive with the assembly, and vertically extending walls 49, thereby defining generally an upwardly open box.

As illustated in FIG. 1, the pan 16 is mounted on and fit into the frame 41, with the rear horizontal surface 15 thereof engaging the top of the rear wall of the frame and the front horizontal surface 60 of the pan engaging the top of the front wall of the frame 41. The gas valve 43 is positioned above the pan 16.

Figure 4:
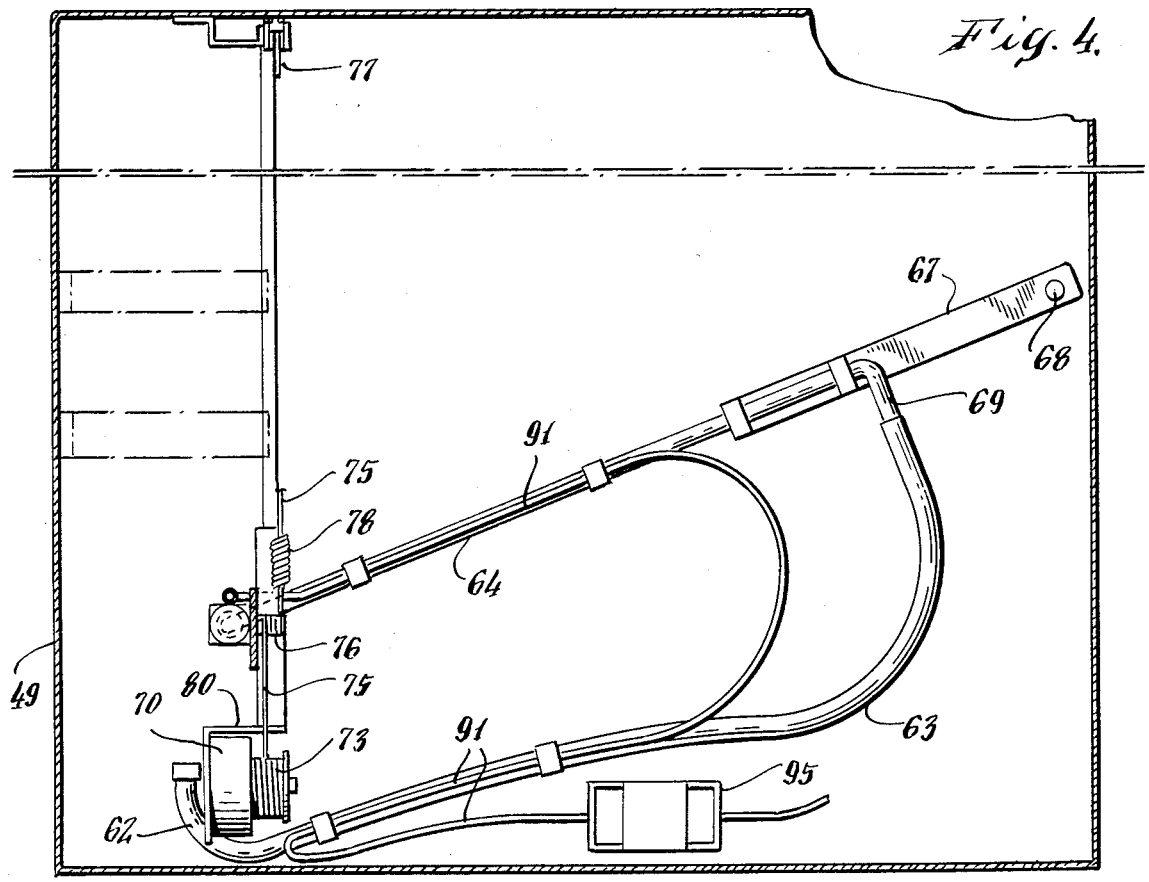
FIG. 4 is a simplified top view of the assembly, illustrating the elements below the pan thereof in greater detail.

The outlet 61 of the valve 43 extends to a tube 62 directed upwardly to the bottom of the frame 41, being joined thereto by a flexible tube 63, of an approved material and construction. The inlet tube 64 to the orifice housing 18 extends upwardly into the orifice housing from the bottom thereof to define the orifice spud, and is mounted to pivot about a vertical axis therein, for example being pivotally mounted to a horizontal extension 65 from the bottom of the vertical wall 23 of frame 21. The orifice spud may be adapted, for example, to pivot through an angle of about 45 degrees with respect to the orifice housing. The pivot is preferably constructed with adequate strength and precision to obviate the necessity of employing the roller 13 to support the end of the burner tube. As illustrated in FIGS. 3 and 4, the tube 64 extends horizontally rearwardly, the rear end thereof being longitudinally slidably mounted in a bracket arm 67. The rear of the bracket arm is pivoted about axis 68 to the rear of the bottom of frame 81. The rear of the tube 64 is bent at right angles to provide a horizontally extending extension 69. The rear of the flexible hose 63 is connected to the extension 69. As a consequence, as more clearly illustrated in FIG. 3, as the burner tube 10 is moved horizontally in the assembly, the tube 64 is angularly displaced to maintain its longitudinal alignment between the pivot 68 and the orifice housing 18, the slidable interconnection between the bracket arm 67 and the tube 64 holding the extension 69 of the tube 64 to have a relatively small displacement, thereby enabling a minimum flexing of the flexible tube 63. The sliding interconnection between the tube 64 and the bracket arm 67 may be effected by any conventional means, for example by mounting the tube 64 to slide through nylon or other grommets (not shown) on the bracket arm 64, the invention, of course, not being limited to this construction. If is, of course, desirable that the tube extension 69 be as close to the pivot 68 as feasible, in order to minimize displacement of the extension.

In order to effect the movement of reciprocation of the burner tube in the assembly, a synchronous motor 70 is mounted to the bottom wall 71 of the pan 16, adjacent one side thereof. The mounting may be effected by leak proof rivets 72 or the like. A drum 73 is mounted on the horizontal shaft of the motor 70. One end of a flexible cable 75 is affixed to a post 76 extending rearwardly from the vertical wall 23 of the movable frame 21, the cable 75 extending therefrom to make several turns around the reel or drum 73, thence extending across the assembly to an idler drum 77 on the opposite side thereof, and returning to the pin 76. A spring 78 may be connected in series with the cable 75, for example at the pin 76, in order to maintain tension of the cable of the drum 73. It is preferable to employ a synchronous motor 70 for displacing the burner tube, since such a motor is adapted to run in either direction, and will reverse its direction of rotation upon being restrained from movement in its current direction of rotation. Thus, the provision of stops restraining movement of the burner tube, at given positions, in both directions, will suffice to effect the reversal of the motor, and, hence, the reciprocation of the burner tube. The positions of such stops is preferably adjustable, in order to enable the user to adjust the end positions of movement of the burner tubes, to thereby control the cooking process. The stops may be of any conventional nature, adapted to preferably adjustably abut any desired portion of the movable structure, for example providing end stops adapted to abut the sliding tube 30. In the absence of such adjustable stops it is of course apparent that the engagement of the slider tube 30 against the fixed portions of the assembly, such as the wall 80, also effects such reversal of the motor.

In alternative arrangements, it is of course apparent that a chain drive may be employed instead of, or in combination with, cable drive, resulting in a reduced cost, and that a sprocket may be employed in place of the drum 73. Instead of the synchronous motor it is apparent that a reversable motor may be employed for driving the burner tube. In such case, the reversing of the motor may be effected by mechanically operated microswitches or the like, and/or control of the motor may be effected by a programmed device such as a microprocessor. The motor preferably is adapted to move the burner tube at a rate of from about one foot a minute to three feet per minute, preferably about 2.25 feet per minute. The higher speeds provide more even heating when a grill is employed in combination with the burner.

As further illustrated in FIGS. 1 and 2, an ignition electrode 90 is mounted to the frame 21, adjacent the burner tube apertures 21, the cable 91 thereof being clamped to extend downwardly to the pivot region of the tube 64, thence along the tube 64 and along the flexible tube 63 as illustrated in FIG. 4, and thence to a spark module 95 which may be mounted, for example, on the bottom of the frame 41. The spark module 95 is connected by electrical wires (not shown) to an operating switch 96 therefore adapted to be operated by a slider or cam 97 on the shaft 44. As a consequence, upon rotation of the knob 45, the module 95 is energized to produce a spark at the ignition electrode, thereby igniting the gas. The spark module, switch and ignition electrode are of conventional construction.

As illustrated in FIGS. 1 and 2, the gas inlet end 17 projects from the burner tube 10 arcuately and downwardly through a slot 100 in the bottom of the pan 16, whereby the pan 16 shields the tube 64, flexible tube 63, spark module, etc., from the burner. A drip pan 101 may be provided on the pan 17, below the burner tube 10, in order to catch drippings. A further panel 102 extends upwardly from the bottom of the panel 16, having a slot 103 for the inlet end 17, this panel 102 having a forwardly extending portion 104 through which the control shaft 44 extends, an upwardly extending portion 105 depending from the portion 104 supporting the switch 96. A forward portion 106 of the wall 104 is upwardly spaced from the front edge of the pan 16, to define a channel 150 for air extending from the front of the assembly downwardly to the orifice housing 18 to provide combustion air.

The assembly further has a top panel 110 covering the burner tube 10, the top having a rectangular aperture 111 beneath which the burner tube moves, and a grill 112 is supported at the periphery of the aperture 111.

The top panel 110 has a downwardly extending rim 115 depending therefrom, the rim 115 extending outwardly beyond the upper edges of the frame 41, to define an air channel or channels 116 between the top panel and the frame 41 for the admission of air into the assembly. In addition, if desired, one or more ports 117 may be provided extending through the rim 115, for example at the front of the assembly, for the admission of additional air into the assembly. The top panel 110 may be hinged to the frame 41 at the rear thereof, for example by hinge 119, to permit the hinging upward of the panel for access to the interior of the assembly. The frontal portions of the panel may be held in their lower position by any suitable conventional means (not shown). If desired, in order to facilitate the hinging upwardly of the top panel, it may be provided with suitable apertures 121 surrounding the knob or knobs 45, so that the cover may be hinged without the necessity of removal of such knobs.

As illustrated in FIG. 1, air may enter the apertures 116 and 117, to flow into the channel 150 for supply of combustion air to the gas, at the orifice 119. The air, in addition, can flow into the assembly above the pan 16, to minimize the downdraft of air through the aperture 111 in the top panel.

As discussed above, the burner of the invention may be employed in combustion with a grill. It is also apparent that it may be used in combination with a rotisserie.

While the invention has been specifically described only with reference to an embodiment employing a gas burner, it is apparent that the invention also contemplates a similar structure wherein the gas burner tube 10 is replaced by an elongated electrical heating element that is adapted to be reciprocated in the manner illustrated for the gas burner tube. The mounting of such an elongated heating element may of course be conventional. In this instance, the heating element may be provided with a higher wattage than conventionally employed in electric range units.

While the invention has been disclosed and described with reference to a single embodiment, it is apparent that variations and modifications may be made therein, without departing from the invention. It is therefore intended in the following claims to cover each such variation and modifications as follows within the true spirit and scope of the invention.

I claim:

1. A cooking appliance comprising a substantially horizontal elongated heat source, means reciprocating said heat source in a horizontal plane in a direction substantially transverse to the lengthwise direction of said heat source, a source of energy for said heat source, and means for directing energy from said source of energy to said heat source.

2. The cooking appliance of claim 1 wherein said elongated heat source comprises a gas burner tube having a row of apertures on or near its upper surface for the passage of gas to be burnt.

3. The cooking appliance of claim 2 further comprising a deflector extending along said gas tube above said apertures, said deflector being inclined, to deflect the dripping of liquids onto said apertures.

4. The cooking appliance of claim 2 wherein said means for directing energy comprises a flexible gas supply tube.

5. The cooking appliance of claim 2 further comprising an igniter mounted to move with said gas burner tube.

6. The cooking appliance of claim 1 further comprising a deflector removably mounted to said heat source and having an inclined surface extending above said heat source to deflect the dripping of liquid onto said heat source.

7. The cooking appliance of claim 1 wherein said means programmably reciprocating said heat source comprises an electrical motor coupled to move said heat source back and forth in said appliance.

8. The cooking appliance of claim 7 further comprising a frame, means mounting said motor in said frame, and a flexible drive element connected to move said elongated heat source by said motor.

9. The cooking appliance of claim 8 further comprising a movable frame, said heat source being mounted on said movable frame, a fixed support rod or tube, and slider means on said movable frame for slidably moving said movable frame on said rod or tube.

10. The cooking appliance of claim 9 wherein one end of said elongated heat source is mounted to said movable frame, and further comprising a fixed frame and roller means for guiding the other end of said heat source on said fixed frame.

11. The cooking appliance of claim 7 wherein said electric motor is a synchronous motor, and further comprising stop means for programmed coverage of movement of said heat source, whereby said synchronous motor reciprocates said heat source.

12. The cooking appliance of claim 1 wherein said appliance comprises a top panel having an aperture exposing said heat source, and a pan below said heat source, and aperture means between the edges of said pan and top panel for permitting airflow therebetween to said heat source.

13. A gas cooking appliance comprising a substantially horizontal elongated burner element, means reciprocating said burner element in a horizontal plane in a direction substantially transverse to the longitudinal direction of said element, a source of gas, and flexible conduit means for conveying gas from said source to said element.

14. The gas cooking appliance of claim 13 wherein said burner element comprises a burner tube having a row of apertures in its upper surface and extending longitudinally thereof, and a deflector mounted on said element to extend above said apertures, said deflector being inclined to deflect dripping liquids from said apertures.

15. The cooking appliance of claim 13 comprising a movable frame, guide means for guiding said movable frame to move in a horizontal direction, said elongated burner element being mounted to said movable frame, said burner element having one end extending downwardly to an orifice housing, and a gas tube extending vertically into said orifice housing for rotation with respect thereto about a vertical axis, said gas tube being connected to said flexible conduit means.

16. The cooking appliance of claim 15 wherein said gas tube has a horizontal portion adjacent the portion extending into said orifice housing, and further comprising pivot mounting means for holding said horizontal portion to be continually directed toward a predetermined fixed pivot axis.

17. The cooking appliance of claim 16 wherein the other end of said gas tube extend horizontally and normal to said horizontal portion, for connection to said flexible conduit means.

18. The cooking appliance of claim 13 further comprising an igniter mounted to said burner element, for igniting gas passing through said apertures.

19. A cooking appliance comprising a substantially horizontal air permeable stationary cooking surface for supporting food to be cooked, a substantially horizontal elongated heat source below said cooking surface, means reciprocating said heat source in a horizontal plane in a direction substantially transverse to the lengthwise direction of said heat source, a source of energy for said heat source, and means for directing energy from said source of energy to said heat source, said heat source directing heat upwardly toward said cooking surface.

20. The cooking appliance of claim 19 wherein said cooking surface comprises an open grill, said energy source comprises a source of combustable gas, said means directing energy comprises a flexible tube, and said heat source comprises a burner tube having upwardly directed ports for directing flame upwardly to contact food on said grill, said burner tube having a deflector extending therealong for deflecting liquids that may drip down from the grill.

21. A gas cooking appliance comprising a substantially horizontal stationary gas permeable food support, a substantial horizontal elongated burner element mounted to direct a flame upwardly toward said food support, means reciprocating said burner element in a horizontal plane in a direction substantially transverse to the longitudinal direction of said element, a source of gas, flexible conduit means for conveying gas from said source to said element, and a deflector on said burner element for deflecting liquids that may drip down from said food support.

22. The gas cooking appliance of claim 21 wherein said means reciprocating said burner element comprises guide means for guiding said burner element for linear movement, said appliance further comprising a gas tube extending downwardly from said burner element, a pivot connection at the bottom of said gas tube, a slidable tube having one end connected to said pivot connection and being mounted for pivotal movement about an axis, means connecting the other end of said slidable tube to said flexible conduit means, and a fixed connection between said source of gas and the other end of said flexible conduit means.

* * * * *